United States Patent
Hsu et al.

(10) Patent No.: US 8,832,353 B2
(45) Date of Patent: Sep. 9, 2014

(54) HOST STOP-TRANSMISSION HANDLING

(75) Inventors: Jonathan Hsu, Newark, CA (US); Shai Traister, San Jose, CA (US)

(73) Assignee: SanDisk Technologies Inc., Plano, TX (US)

( * ) Notice: Subject to any disclaimer, the term of this patent is extended or adjusted under 35 U.S.C. 154(b) by 482 days.

(21) Appl. No.: 12/487,063

(22) Filed: Jun. 18, 2009

(65) Prior Publication Data

US 2010/0257308 A1    Oct. 7, 2010

Related U.S. Application Data

(60) Provisional application No. 61/167,480, filed on Apr. 7, 2009.

(51) Int. Cl.
- *G06F 12/00* (2006.01)
- *G06F 12/02* (2006.01)
- *G06F 12/08* (2006.01)

(52) U.S. Cl.
CPC .... *G06F 12/0246* (2013.01); *G06F 2212/7202* (2013.01); *G06F 2212/7203* (2013.01); *G06F 12/0804* (2013.01)
USPC .......................................... 711/103; 711/118

(58) Field of Classification Search
None
See application file for complete search history.

(56) References Cited

U.S. PATENT DOCUMENTS

| | | | |
|---|---|---|---|
| 5,798,968 A * | 8/1998 | Lee et al. ................. | 365/185.29 |
| 5,838,894 A | 11/1998 | Horst | |
| 5,862,074 A | 1/1999 | Park | |
| 5,867,429 A | 2/1999 | Chen et al. | |
| 5,890,192 A * | 3/1999 | Lee et al. ..................... | 711/103 |
| 6,246,626 B1 | 6/2001 | Roohparvar | |
| 6,266,273 B1 | 7/2001 | Conley et al. | |
| 6,763,424 B2 | 7/2004 | Conley | |
| 6,937,510 B2 | 8/2005 | Hosano et al. | |
| 7,061,798 B2 | 6/2006 | Chen et al. | |
| 7,120,051 B2 | 10/2006 | Gorobets et al. | |
| 7,158,421 B2 | 1/2007 | Li et al. | |
| 7,193,896 B2 | 3/2007 | Shiga | |
| 7,315,916 B2 * | 1/2008 | Bennett et al. ............... | 711/103 |
| 7,409,473 B2 | 8/2008 | Conley et al. | |
| 7,412,560 B2 | 8/2008 | Smith et al. | |
| 7,447,078 B2 | 11/2008 | Li | |
| 7,463,521 B2 | 12/2008 | Li | |
| 7,475,174 B2 | 1/2009 | Chow et al. | |

(Continued)

FOREIGN PATENT DOCUMENTS

WO    WO 2009/020845    2/2009

OTHER PUBLICATIONS

U.S. Office Action dated Jan. 5, 2011 issued in U.S. Appl. No. 12/485,827.

(Continued)

*Primary Examiner* — Matthew Bradley
*Assistant Examiner* — Daniel Tsui
(74) *Attorney, Agent, or Firm* — Weaver Austin Villeneuve & Sampson LLP (57) ABSTRACT

A memory system includes a controller and a memory array that stores partial-page data and complete-page data in separate areas. Data received from a host is sent from a memory controller to an on-chip cache prior to determining whether the data is partial-page data or complete-page data. After a determination is made, the data is stored at an address in the corresponding area.

36 Claims, 6 Drawing Sheets

(56) References Cited

U.S. PATENT DOCUMENTS

| | | |
|---|---|---|
| 7,480,181 B2 | 1/2009 | Li |
| 7,490,283 B2 | 2/2009 | Gorobets et al. |
| 7,502,260 B2 | 3/2009 | Li et al. |
| 7,505,320 B2 | 3/2009 | Li |
| 7,586,784 B2 | 9/2009 | Roohparvar |
| 7,594,157 B2 | 9/2009 | Choi et al. |
| 7,755,950 B2 | 7/2010 | Yu et al. |
| 7,761,740 B2 | 7/2010 | Kern et al. |
| 7,827,348 B2 | 11/2010 | Lee et al. |
| 7,873,778 B2 | 1/2011 | Choi et al. |
| 7,934,074 B2 | 4/2011 | Lee et al. |
| 7,945,825 B2 | 5/2011 | Cohen et al. |
| 8,046,528 B2 | 10/2011 | Chu et al. |
| 8,132,045 B2 | 3/2012 | Avila et al. |
| 8,134,872 B2 | 3/2012 | Roohparvar |
| 8,307,241 B2 | 11/2012 | Avila et al. |
| 2003/0137874 A1* | 7/2003 | Furukawa ................. 365/185.17 |
| 2004/0188710 A1 | 9/2004 | Koren et al. |
| 2005/0141312 A1 | 6/2005 | Sinclair et al. |
| 2005/0204187 A1 | 9/2005 | Lee et al. |
| 2006/0031593 A1 | 2/2006 | Sinclair |
| 2006/0034120 A1 | 2/2006 | Isobe et al. |
| 2006/0136656 A1 | 6/2006 | Conley et al. |
| 2006/0184720 A1 | 8/2006 | Sinclair et al. |
| 2006/0198202 A1 | 9/2006 | Erez |
| 2006/0271748 A1 | 11/2006 | Jain et al. |
| 2007/0101096 A1 | 5/2007 | Gorobets |
| 2007/0140036 A1 | 6/2007 | Noguchi et al. |
| 2008/0016269 A1 | 1/2008 | Chow et al. |
| 2008/0183949 A1 | 7/2008 | Ly et al. |
| 2008/0195804 A1 | 8/2008 | Kim et al. |
| 2008/0250195 A1* | 10/2008 | Chow et al. ................... 711/103 |
| 2008/0253184 A1 | 10/2008 | Sakurai et al. |
| 2008/0316816 A1 | 12/2008 | Lin |
| 2009/0276474 A1 | 11/2009 | Sela et al. |
| 2010/0030951 A1 | 2/2010 | Kim |
| 2010/0074012 A1 | 3/2010 | Park et al. |
| 2010/0318721 A1 | 12/2010 | Avila et al. |
| 2010/0318839 A1 | 12/2010 | Avila et al. |
| 2012/0170380 A1 | 7/2012 | Kumazaki et al. |

OTHER PUBLICATIONS

U.S. Final Office Action dated May 23, 2011 issued in U.S. Appl. No. 12/485,827.
U.S. Notice of Allowance dated Oct. 28, 2011 issued in U.S. Appl. No. 12/485,827.
U.S. Office Action dated Mar. 27, 2012 issued in U.S. Appl. No. 12/485,846.
Cardinal Search Report, "2001.21 Lower Page Program Failure Handling with Internal Memory Latch XDL," prepared Jan. 21, 2009. Cardinal Intellectual Property, Inc., 40 pp.
Cardinal Search Report, "2001.22 Lower Page Program Failure Handling with Internal Memory Latch XDL," prepared Jan. 22, 2009. Cardinal Intellectual Property, Inc., 4 pp.
U.S. Notice of Allowance dated Jul. 11, 2012 issued in U.S. Appl. No. 12/485,846.
U.S. Appl. No. 13/401,494, Feb. 21, 2012, Lee et al.
U.S. Appl. No. 13/841,180, Mar. 15, 2013, Dusija et al.
Cardinal Search Report, "2001.43 SD Stop Transmission Handling Through Address Change Command Sequence," prepared Mar. 19, 2009. Cardinal Intellectual Property, Inc.

* cited by examiner

HOST STOP-TRANSMISSION HANDLING

BACKGROUND OF THE INVENTION

This invention relates to nonvolatile memory systems and methods of operating nonvolatile memory systems.

Nonvolatile memory systems are used in various applications. Some nonvolatile memory systems are embedded in a larger system such as a personal computer. Other nonvolatile memory systems are removably connected to a host system and may be interchanged between different host systems. Examples of such removable memory systems include memory cards and USB flash drives. Electronic circuit cards, including non-volatile memory cards, have been commercially implemented according to a number of well-known standards. Memory cards are used with personal computers, cellular telephones, personal digital assistants (PDAs), digital still cameras, digital movie cameras, portable audio players and other host electronic devices for the storage of large amounts of data. Such cards usually contain a re-programmable non-volatile semiconductor memory cell array along with a controller that controls and supports operation of the memory cell array and interfaces with a host to which the card is connected. Several of the same type of card may be interchanged in a host card slot designed to accept that type of card. However, the development of the many electronic card standards has created different types of cards that are incompatible with each other in various degrees. A card made according to one standard is usually not useable with a host designed to operate with a card of another standard. Memory card standards include PC Card, CompactFlash™ card (CF™ card), SmartMedia™ card, MultiMediaCard (MMC™), Secure Digital (SD™) card, a miniSD™ card, Subscriber Identity Module (SIM), Memory Stick™, Memory Stick Duo card and microSD/TransFlash™ memory module standards. There are several USB flash drive products commercially available from SanDisk Corporation under its trademark "Cruzer®" USB flash drives are typically larger and shaped differently than the memory cards described above.

Different types of flash memory array architecture are used in nonvolatile memory systems. In one type of architecture, a NAND array, strings of more than two memory cells, such as 16 or 32, are connected along with one or more select transistors between individual bit lines and a reference potential to form columns of cells. Word lines extend across cells within a large number of these columns.

An individual flash memory cell may hold one bit of data in what is known as a Single Level Cell (SLC) memory. In some examples, a memory cell may hold two or more bits of data in what is known as a Multi Level Cell (MLC) memory.

SUMMARY OF THE INVENTION

A nonvolatile memory system according to an embodiment of the present invention stores complete-page data in one portion of a memory array and stores partial-page data in a different portion of the memory array. Data is sent from a controller to an on-chip cache prior to determining which of these areas the data is to be stored in. Then, after the data is stored in the on-chip cache, a determination is made and the data is written to the appropriate location.

According to an embodiment, a method of managing storage of data in a memory array that separately stores complete-page data and partial-page data comprises: storing received data in an on-chip cache in a peripheral area of the memory array prior to writing the received data to the memory array; and when a stop-transmission command is received prior to writing the received data to the memory array, and the received data is less than the data of a complete page, writing the received data to an area of the memory array that is dedicated to storage of partial-page data.

The stop-transmission command may be a Secure Digital stop-transmission command from a host. The received data may be initially assigned to a first location in the memory array that is dedicated to storage of complete-page data, and when the stop-transmission command is received, the data is assigned to a second location in the area of the memory array that is dedicated to storage of partial-page data. The data may be assigned to the second location by a memory controller or an on-chip circuit that is peripheral to the memory array. The memory array stores data in multi-level cells that individually store more than one bit of data. The memory array may comprise two or more planes that are programmed in parallel. The area of the memory that is dedicated to storage of partial-page data may extend across the two or more planes or may be limited to one plane of the two or more planes.

According to an embodiment, a method of managing streams of data in a nonvolatile memory array that does not permit more than one programming operation per page without erase comprises: maintaining a first area of the nonvolatile memory array for storage of complete pages of data; maintaining a second area of the nonvolatile memory array for storage of partial pages of data; storing a portion of data in a page buffer in the memory periphery before a determination is made whether to store the portion of data in the first area or the second area; subsequently, determining whether to store the portion of data in the first area or the second area; and writing the portion of data from the page buffer to the first area or the second area according to the determination.

The determining may be performed in response to receiving a stop-transmission command. The stop-transmission command may be a Secure Digital stop-transmission command received from a host. The nonvolatile memory array may comprise two or more planes and the second area may extend across all of the two or more planes, or the second area may be contained within one of the two or more planes. Determining whether to store the portion of data in the first area or the second area may further comprise determining whether the data is complete-page data or partial-page data. Determining whether the data is complete-page data or partial-page data may further comprise detecting whether a stop-transmission has been received.

According to an embodiment, a method of handling streaming data in a buffered nonvolatile memory comprises: receiving a stream of data from a host without a prior indication of the amount of data; copying a portion of the stream of data from a memory controller to an on-chip cache prior to identifying the portion of the stream of data as partial page data; while the portion of the stream of data is in the on-chip cache, receiving an indication from the host that requires the portion of the stream of data to be written to the memory array; in response to receipt of the indication, determining that the portion of the stream of data is partial-page data; in response to the determination, selecting an area of the memory array that is dedicated to storage of partial-page data; and writing the portion of the stream of data to the area.

The indication may be a Secure Digital stop-transmission command. The memory array may comprise two or more planes and the area may extend across all of the two or more planes, or the area may be limited to fewer than all of the two or more planes. The area may be limited to one of the two or more planes.

According to an embodiment, a nonvolatile memory system comprises: a nonvolatile memory array that includes a first area for writing complete pages and a second area for writing partial pages; and an on-chip cache in a peripheral area of the memory array, the on chip cache storing data to be written to the nonvolatile memory array prior to determining whether to write the stored data to the first area or the second area.

The memory array may comprise two or more planes. The second area may extend across all of the two or more planes, or the second area may be contained within one of the two or more planes. The nonvolatile memory system may further comprise a memory controller that sends data to be stored in the nonvolatile memory array, the memory controller in communication with a host. The nonvolatile memory system may further comprise a memory card physical interface for communication with the host. The physical interface may be a Secure Digital interface and communication with the host may communication according to the Secure Digital standard. The on-chip cache may be configured to determine whether to write the stored data to the first area or the second area in response to receipt of a Secure Digital stop transmission command from the host.

DETAILED DESCRIPTION OF ILLUSTRATED EMBODIMENTS

It is common in current commercial products for each storage element of a flash EEPROM array to store a single bit of data by operating in a binary mode, where two ranges of threshold voltage of the storage element transistors are defined as two memory states. The threshold voltages of transistors correspond to ranges of charge levels stored on their storage elements. In addition to shrinking the size of the memory arrays, the trend is to further increase the density of data storage of such memory arrays by storing more than one bit of data in each storage element transistor. This is accomplished by defining more than two threshold voltage levels as memory states for each storage element transistor, four such states (2 bits of data per storage element) being used in one example. More storage states, such as 16 states (4 data bits) per storage element may also be used. Each storage element memory transistor has a certain total range (window) of threshold voltages in which it may practically be operated, and that range is divided into the number of states defined for it plus margins between the states to allow for them to be clearly differentiated from one another.

As the number of states stored in each memory cell increases, the tolerance of any shifts in the programmed charge level on the storage elements decreases. Since the ranges of charge designated for each memory state must necessarily be made narrower and placed closer together as the number of states stored on each memory cell storage element increases, the programming must be performed with an increased degree of precision and the extent of any post-programming shifts in the stored charge levels that can be tolerated, either actual or apparent shifts, is reduced. Actual disturbs to the charge stored in one cell can be created when programming and reading that cell, and when reading, programming and erasing other cells that have some degree of electrical coupling with that cell, such as those in the same column or row, and those sharing a line or node.

Apparent shifts in the stored charge levels occur because of field coupling between storage elements. The degree of this coupling is necessarily increasing as the spaces between memory cell storage elements are being decreased, which is occurring as the result of improvements of integrated circuit manufacturing techniques. The problem occurs most pronouncedly between two groups of adjacent cells that have been programmed at different times. One group of cells is programmed to add a level of charge to their storage elements that corresponds to one set of data. After the second group of cells is programmed with a second set of data, the charge levels read from the storage elements of the first group of cells often appear to be different than programmed because of the effect of the charge on the second group of storage elements being capacitively coupled with the first. This is known as the Yupin effect, and is described in U.S. Pat. No. 5,867,429. This patent describes either physically isolating the two groups of storage elements from each other, or taking into account the effect of the charge on the second group of storage elements when reading that of the first group. Various programming schemes may be used to reduce Yupin effect. In particular, programming of MLC memory may be done in stages, a first stage is performed to bring a group of memory cells close to their desired charge levels. Then, only after neighboring cells have undergone at least a first stage, a second stage is performed to bring the cells to their desired levels. Thus, the final charge levels reflect changes caused by programming of neighboring cells.

Because of the higher precision required in programming MLC memory, more time is generally needed than for programming SLC memory. Also, programming in multiple steps to reduce apparent shifts in charge levels may take more time. This means that MLC storage, though more efficient in using space in a memory array, may be slower than SLC memory, at least for programming. In order to take advantage of the storage efficiency of MLC memory and the speed of SLC memory, data may initially be written to SLC memory and later copied to MLC memory. Once all data from an SLC block is copied to an MLC block, the SLC block may be erased so that it becomes available for subsequent use.

Figure 1:
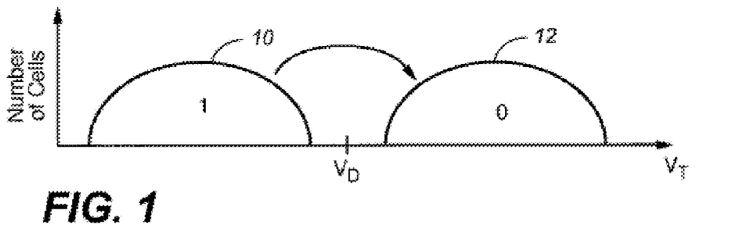
FIG. 1 shows programming of an SLC memory.

FIG. 1 shows programming of a SLC memory. The threshold voltage ($V_T$) of a cell is mapped to two distinct ranges representing two memory states and threshold voltages of individual cells are represented by distributions 10, 12 shown for logical state 1 and logical state 0 respectively. An erased memory cell represents a logic 1 state. A programmed cell represents a logic 0 state. Generally, memory cells are erased together in a unit of a block (erase block) so that all cells in the block are brought to the logic 1 state together. Cells are generally programmed together in units of a page, where a block consists of one or more pages. In one example, a NAND flash memory consists of blocks of cells, with each block consisting of multiple pages that are formed by rows of memory cells. Examples of NAND flash memory systems and their operation are provided in U.S. Pat. No. 7,061,798. During programming, cells that are to hold a logical 0 have their threshold voltage increased as shown, while cells that are to hold a logical 1 remain at their erased threshold voltage. Programming may include a series of pulse and verify steps. Once the cells are programmed, the state of a cell is read by comparing the threshold voltage of the cell to a discrimination voltage ($V_D$). Thus, any cell having a threshold voltage less than $V_D$ is read as storing a 1, and any cell having a threshold voltage greater than $V_D$ is read as storing a 0.

Figure 2A:
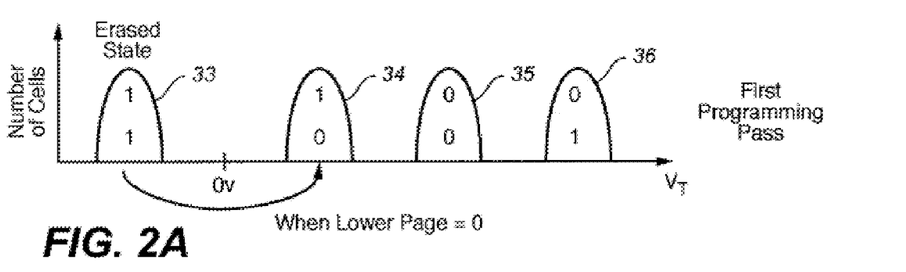
FIG. 2A shows a first stage of programming an MLC memory.

FIG. 2A shows a first stage of programming MLC memory. In particular, FIG. 2A shows the threshold voltage of a cell having four different threshold voltage ranges assigned to four different memory states 33-36. The erased state 33 has the lowest threshold voltage range, indicated by a threshold voltage less than 0 volts in this example. The first programming stage of FIG. 2A programs some cells to the next state, state 34 and leaves others in erased state 33. This programming stage (first pass) generally programs cells of a page of memory together and the bits programmed in this way may be considered as a logical page (lower page). Thus, after the first pass programming of FIG. 2A a first logical page has been programmed and all cells of the physical page in the memory array are either in the erased state 33 or first programmed state 34. Programming may be achieved by a series of programming pulses with verification performed between pulses.

Figure 2B:
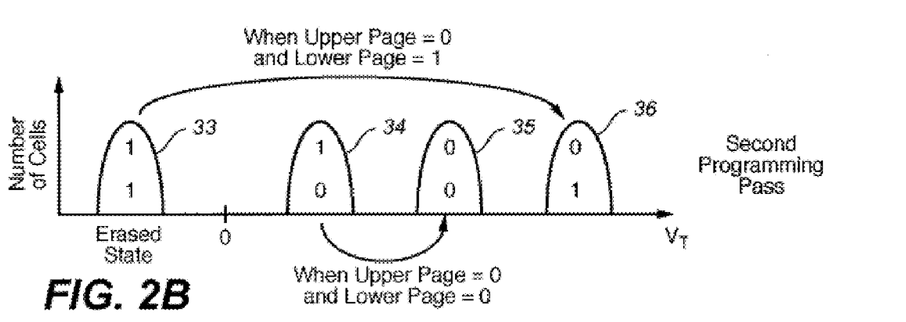
FIG. 2B shows a subsequent second stage of programming the MLC memory of FIG. 2A.

FIG. 2B shows a second programming stage (second pass) that is performed subsequent to the first stage of FIG. 2A. In this stage, cells are programmed according to bits of a second logical page (upper page). For cells storing a 1 in the upper page, the memory state remains in erased state 33 or first programmed state 34. For cells storing a 0 in the upper page, the memory state is programmed to second programmed state 35 or third programmed state 36 as shown. Cells in erased state 33 are programmed to third programmed state 36 and cells in first programmed state 34 are programmed to second programmed state 35 as shown. Thus, after the second programming stage, a cell may be in any one of four possible memory states as determined by an upper page bit and a lower page bit as indicated by bits shown in distributions of cells in states 33-36. It will be understood that FIGS. 2A and 2B show an exemplary scheme and other schemes may also be used to program MLC memory.

While storing larger amounts of data per unit area in a memory array is achievable using MLC as compared with SLC, reducing the speed of programming is generally not desirable and may not be acceptable for certain applications. In particular, for removable mass storage applications (e.g. in flash memory cards or USB flash drives), hosts may require data to be stored within a specified maximum time. In order to take advantage of the storage efficiency of MLC without suffering a time penalty, data may initially be stored in SLC and later stored in MLC at a time when resources are available, e.g. data may be moved to MLC as a background operation. When the data is stored in SLC, an indication may be sent to the host indicating that the data is stored. Thus, the host sees data storage taking place at the speed of SLC storage. Subsequent storage in MLC may be transparent to the host. As long as transfer of data from SLC memory to MLC memory takes place in a timely manner, the extra space occupied by data in SLC memory may not have a significant impact.

Many memory chips have some form of latches or registers that hold data prior to, or during, programming of data to the memory array. Such latches may be used to as an on-chip cache to provide faster transfer of data. Examples of such on-chip cache are provided in US Patent Application Publication No. 2006/0136656, which is hereby incorporated by reference for all purposes. Additional examples of how data latches may be used for caching data on a memory chip are provided in U.S. Pat. No. 7,505,320, which is hereby incorporated by reference for all purposes.

Figure 3:
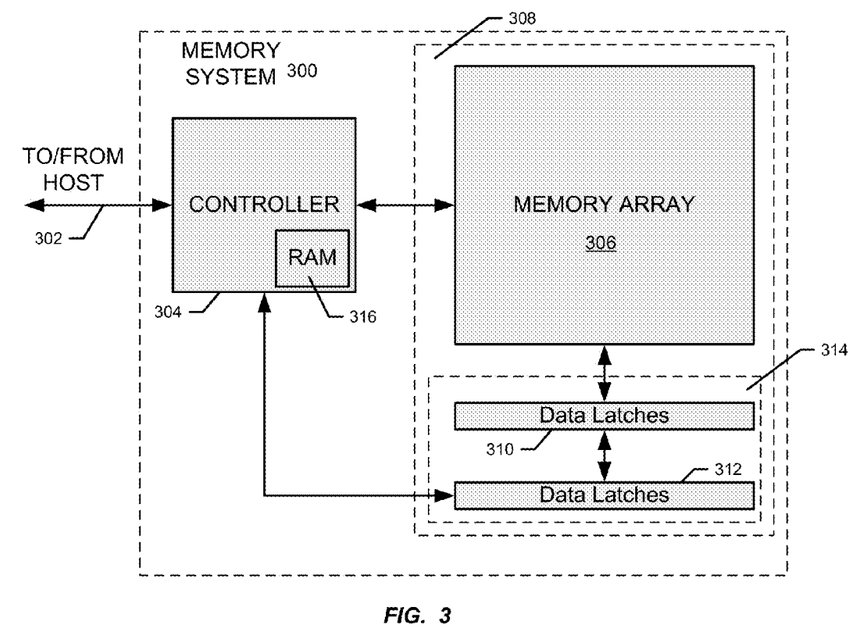
FIG. 3 shows a memory system in communication with a host.

FIG. 3 shows an example of a memory system 300 that may be embodied in a memory card, USB flash drive, or other removable nonvolatile memory system. FIG. 3 shows communication to and from a host, which generally occurs through a standardized interface 302. Such an interface is generally established by a standard that dictates the physical arrangement of contacts and the details of how communication is to occur between the host and memory system. The memory system 300 includes a controller 304 that manages communication with the host and also manages how data is stored in the memory array 306. In a typical arrangement, the memory controller determines where particular data is stored in the memory array and maintains a logical-to-physical mapping that relates logical addresses provided by the host to physical addresses in the memory array. FIG. 3 shows the controller 304 on a separate chip to the memory array 306, though in some examples, the controller may be on the same chip as the controller. The memory chip 308 includes two sets of data latches 310, 312 that may be considered together as an on-chip cache 314. "On-chip" here indicates that the data latches are on the same chip as the memory array, and the data latches may be considered as peripheral circuits on the memory chip 308. The on-chip cache may also be considered to be a buffer for the memory array 306, and a memory array having such a buffer may be referred to as a buffered memory array. Data latches 310, 312 are connected to bit lines so that the data to be written to a page is stored in a set of data latches which form a page buffer. Thus, the sets of data latches shown form two page buffers 310, 312, each of which contains data to be written to one page of the memory array 306. In some examples, data for a lower page may be held in one page buffer while data for an upper page is held in another page buffer. The controller 304 also includes a volatile memory (controller RAM 316) which may be used to store data from the host prior to storing it in the memory array.

In a typical arrangement, the memory array is programmed in a unit called a page which extends along a word line. In such an arrangement, a page forms the minimum unit of programming. Because each cell holds more than one bit, a word line holds more than one page. For example, where cells of a word line each store two bits of data, the word line stores two pages of data, commonly referred to as lower-page and upper-page data. A page may be programmed once with data. However, if the page is subsequently programmed with additional data (without first erasing the original data) the original data may be corrupted by the subsequent programming. Because of the risk of such corruption, a memory array may be operated so that once a page is written, subsequent writing to that page is prohibited even if the page is not full. Dummy data may be used to fill up the unused portion of such a page. However, storing less than a full page of data to a page is inefficient, and it is generally desirable to combine such partial-page data with other partial-page data so that the memory array is more efficiently used. In some memory arrays, a portion of the memory array is dedicated to storage of partial-page data. Such partial-page data may later be relocated if additional data is received to form a complete-page, or if partial-pages can be combined in a manner that forms complete-pages. Such a dedicated area may include one or more blocks. The physical area that is dedicated for partial-page storage may be changed for wear-leveling purposes. Another portion of the memory array (other than the portion that is dedicated to storage of partial-page data) may be dedicated to storage of complete-page data. Complete-page storage commonly occupies the majority of the memory array. Additional portions of a memory array may be dedicated to storage of management data (such as FAT and directory information) or other purposes.

Memory cells of a typical flash EEPROM array are divided into discrete blocks of cells that are erased together. That is, the block is the erase unit, a minimum number of cells that are simultaneously erasable. Each block typically stores one or more pages of data, the page being the minimum unit of programming and reading, although more than one page may be programmed or read in parallel in different sub-arrays or planes. Each page typically stores one or more sectors of data, the size of the sector being defined by the host system. An example sector includes 512 bytes of user data, following a standard established with magnetic disk drives, plus some number of bytes of overhead information about the user data and/or the block in which they are stored. Such memories are typically configured with 16, 32 or more pages within each block, and each page stores one or just a few host sectors of data.

In order to increase the degree of parallelism, and thus improve performance, during programming user data into the memory array and reading user data from it, the array is typically divided into sub-arrays, commonly referred to as planes, which contain their own data registers and other circuits to allow parallel operation such that sectors of data may be programmed to or read from each of several or all the planes simultaneously. An array on a single integrated circuit may be physically divided into planes, or each plane may be formed from a separate one or more integrated circuit chips. Examples of such a memory implementation are described in U.S. Pat. Nos. 5,798,968 and 5,890,192.

To further efficiently manage the memory, blocks may be linked together to form virtual blocks or metablocks. That is, each metablock is defined to include one block from each plane. Use of the metablock is described in U.S. Pat. No. 6,763,424, which patent, along with all other patents and patent applications referred to in this application, is hereby incorporated by reference. The metablock is identified by a host logical block address as a destination for programming and reading data. Similarly, all blocks of a metablock are erased together. The controller in a memory system operated with such large blocks and/or metablocks performs a number of functions including the translation between logical block addresses (LBAs) received from a host, and physical block numbers (PBNs) within the memory cell array. Individual pages within the blocks are typically identified by offsets within the block address. Address translation often involves use of intermediate terms of a logical block number (LBN) and logical page.

Figure 4:
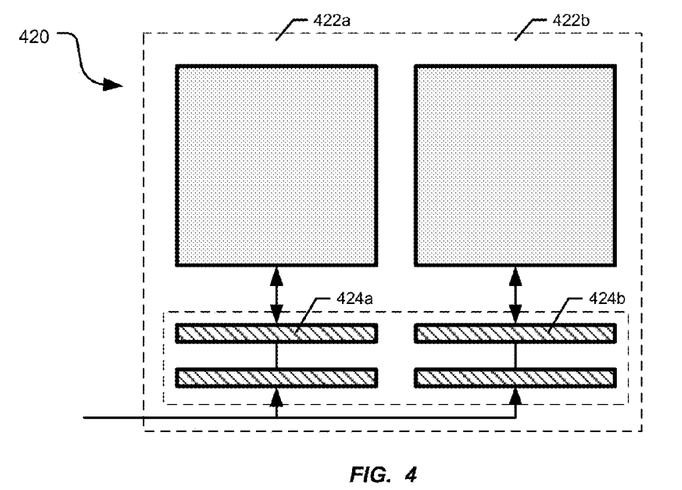
FIG. 4 shows a memory chip with two planes.

FIG. 4 shows a memory array 420 that is formed as two planes 422a, 422b, each having an array portion and an on-chip cache portion. The present application uses the term "page" to refer to the unit of programming of the memory array, which may be a page of a single plane (sometimes referred to as a "die-page") where one page is programmed at a time, or a meta-page that extends across multiple planes where planes are programmed in parallel. Thus, the term page buffer may refer to the data latches that hold data to be programmed to a meta-page rather than just the data latches that hold data for the portion of the meta-page in a single plane. For example, data latches 424a, 424b form a page buffer in FIG. 4 because data latches 424a, 424b together hold all the data for a page that extends across both planes. In general, techniques described here with respect to a page will be understood to apply equally to a single die-page within a plane, or to a page (metapage) that extends across two or more planes of a memory array. The memory array of FIG. 4 may include a portion that stores partial-page data and another portion that stores complete-page data. In some arrangements, the portion that is dedicated for storage of partial-page data extends across both planes, while in other arrangements, the portion that is dedicated for storage of partial-page data is limited to one plane.

One feature of removable memory systems such as USB flash drives and flash memory cards is that they may be removed from a host and may interface with different hosts at different times. Generally, a removable memory system should be placed in a safe condition prior to being removed from a host or losing power from the host. Some host interface standards require that all data be saved to nonvolatile memory (not just cached in a volatile memory) in response to particular conditions so that such a removable memory system is in condition to be powered down or removed. An example is a "stop transmission" command used in the Secure Digital standard, which requires that all data be guaranteed by the card. When such conditions occur, any data that is stored in a volatile memory (such as controller RAM or on-chip cache) is written to the memory array. Complete-page data is written to the area of the memory array that is dedicated to storage of complete-page data. Partial-page data is written to the area of the memory array that is dedicated to storage of partial-page data. However, where data is sent by a host without any prior indication of the amount of data that is being sent, it is not known beforehand whether the data will be complete-page data or partial-page data. For example, where a host sends streaming data (without any prior indication of the amount of data), the memory system receiving such data does not know whether a particular portion of the streamed data is going to be complete-page data or partial-page data until either enough data is received to fill a page (complete-page data), or conditions require saving the data prior to receipt of enough data to fill a page (partial-page data) e.g. because the host sends a stop transmission command.

One approach to handling such data is to store data in controller RAM until it is established whether the data should be saved as partial-page data or complete-page data. Then, when the controller establishes where the data is to be stored, the controller selects an address in the corresponding portion of the memory array (either in the partial-page portion, or full-page portion), and sends the data to be stored at that address. In this approach, data is maintained in controller RAM until a determination is made as to whether the data is partial-page data or complete-page data. However, this may require an undesirably large controller RAM (holding at least a page of data), which increases the cost of the controller. Also, there is some delay in transferring data to the memory array because the data is held in the controller RAM until a complete page is available, or programming of a partial-page is required. This may have a negative impact on system performance which may be especially significant where a host operates in small command sizes (such as 16 KB or 32 KB in SD Speedclass, for example).

Another approach is to temporarily store the data in an intermediate storage (IS) area. For example, the data may be stored in SLC initially and later stored in MLC when enough additional data is received to form complete-page data. However, this approach requires additional SLC blocks in the memory array, which increases the cost of the memory array. Also, management of such an intermediate storage area adds to system complexity and may not be desirable in low cost systems.

According to an embodiment of the present invention, data is sent from the controller to the memory chip prior to determining whether the data is partial-page data or complete-page data. Such data is then held in on-chip cache until a determination is made, and in response to the determination the data is stored in the appropriate location, either in the partial-page area or the complete-page area of the memory array. This means that the controller RAM can be relatively small because it does not have to hold data until the determination is made. Instead, the controller RAM sends the data to the on-chip cache prior to making any determination. The data may initially be assigned to a default destination. For example, the data may be assigned by default to the complete-page area. However, the data is not written to the memory array until a determination is made. The data is stored in on-chip cache and is only written to the memory array after enough data is received to form a complete-page, or some condition occurs which requires the data to be written as partial-page data.

Figure 5:
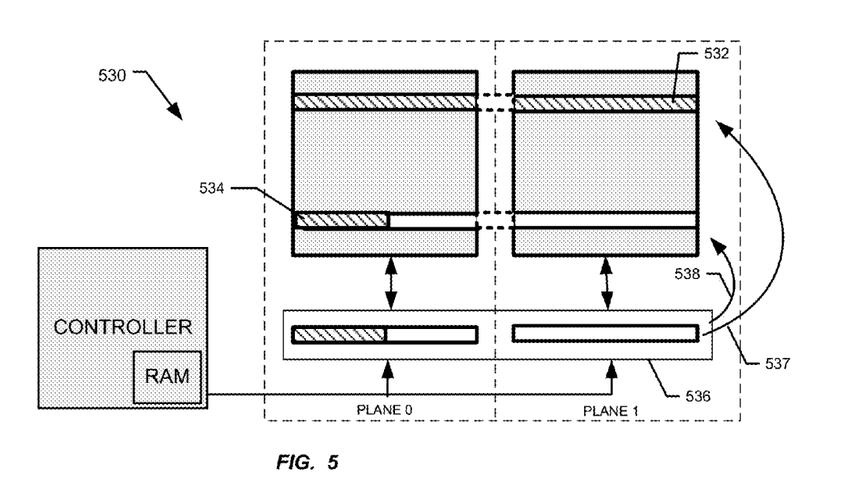
FIG. 5 shows a memory array with an area for storage of partial-page data and a separate area for storage of complete-page data.

FIG. 5 shows an example of a memory system 530 which stores complete-page data in one area of a memory array 532 and stores partial-page data in another area of the memory array 534. When data is received from a host without an indication of the amount of data being sent, the data is transferred from the controller to the on-chip cache 536 before determining if the data is complete-page data or partial-page data. If sufficient data is received to fill a page (i.e. fills a page buffer in the on-chip cache 536), then the data is written 537 to the complete-page area 532. If a condition occurs that requires storing the data to the nonvolatile memory prior to receipt of a full page of data, then the data is written 538 to the partial-page area 534.

Figure 6A:
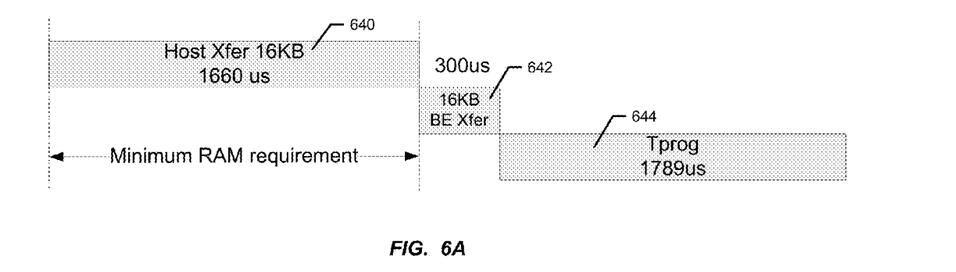
FIG. 6A is a timing diagram for a data transfer scheme.

FIG. 6A shows a timing diagram for a scheme in which data is held in controller RAM until a determination is made as to whether the data is complete-page data or partial-page data. Here, the host transfers 16 KB of data 640, which is held in controller RAM, thus setting a minimum size requirement for controller RAM. Once an entire 16 KB is received, the controller determines that the data is complete-page data (because the page size is 16 KB in this example), so the data is transferred to the on-chip cache 642. From the on-chip cache, the data is written to the memory array 644.

Figure 6B:
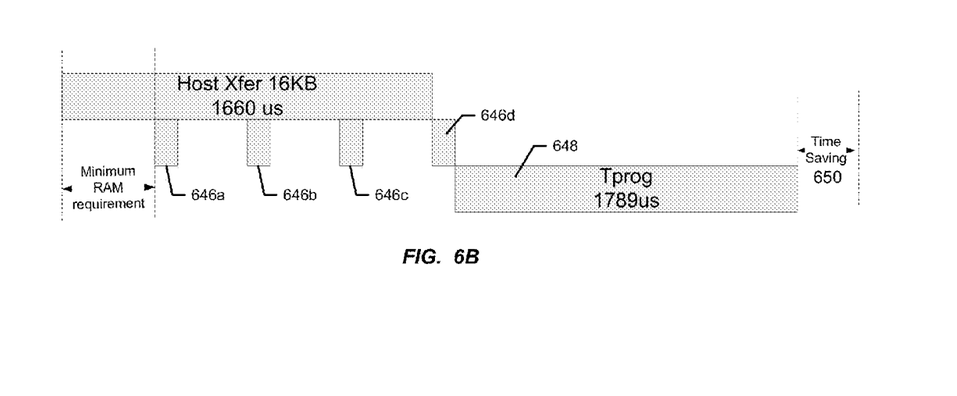
FIG. 6B is a timing diagram for an alternative data transfer scheme.

In contrast, FIG. 6B shows a timing diagram for a scheme in which data is transferred to the on-chip cache prior to making a determination as to where to store the data. In this example, the data is transferred from the controller to the on-chip cache in 4 KB portions 646a-d, though in other examples data may be transferred in different sized chunks. Because data is transferred from the controller RAM as soon as 4 KB is received from the host, the minimum controller RAM required is 4 KB. Also, after sufficient data to fill a complete page is received by the controller, writing the data may begin sooner because most of the data (three of four 4 KB chunks 646a-c) have already been transferred to the on-chip cache. Thus, there is a time saving 650 so that the scheme of FIG. 6B reduces cost and improves performance compared with the scheme of FIG. 6A.

Figure 7:
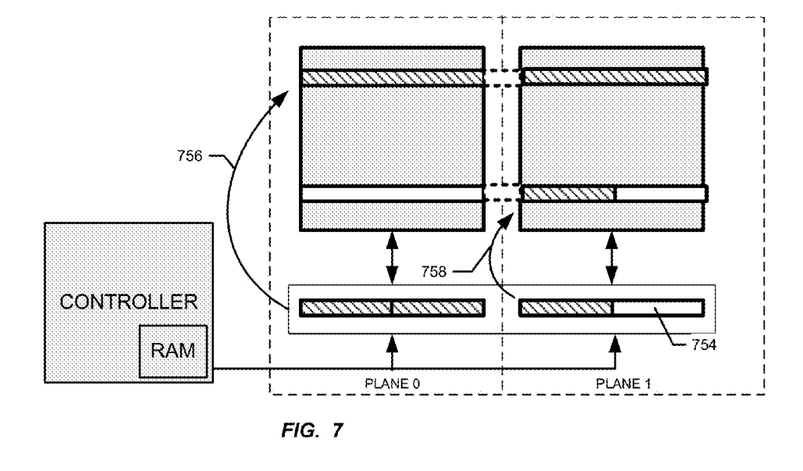
FIG. 7 shows programming of partial-page data in a two-plane memory array.

In a multi-plane design, partial-page data may extend over any number of planes. For example, in the two-plane example of FIG. 7, the partial page data may all be in plane 0, or may extend to plane 1. The handling of partial-page data may be different depending on where the break occurs in the data. Where all the data to be stored is less than a die-page and thus corresponds to just one plane, all the data is stored in the partial-page area. However, where the data to be stored extends over more than one plane, the data may not all be stored in the partial-page area. For example, FIG. 7 shows data in the on-chip cache 754 that corresponds to a complete die-page in plane 0 and a partial die-page in plane 1. In this arrangement, cached data may be programmed 756 to the complete-page area in plane 0, and programmed 758 to partial-page area in plane 1.

Figure 8A:
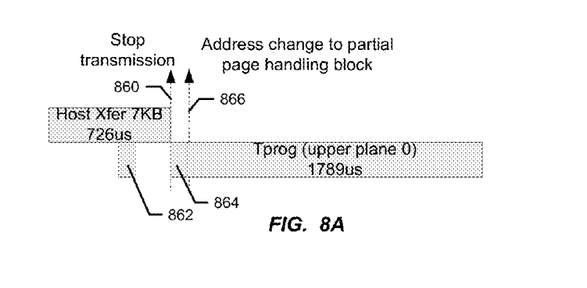
FIG. 8A shows a timing diagram for an example of partial-page programming.

FIG. 8A shows a timing diagram for a scenario where a stop transmission command 860 is received at a point where all the cached data to be written is less than a die-page. Here, the stop transmission command is received after 7 KB of host data is received (where a complete page holds 16 KB, and each die-page holds 8 KB). 4 KB of data 862 is already in the on-chip cache at this point, and the remaining 3 KB is immediately transferred from the controller RAM to the on-chip cache 864. Because the data is less than the data of a complete page and must be written immediately, it is assigned to the partial-page area. In this example, the default assignment is to the complete-page area, so an address change is made 866. The address change may be performed by the memory controller or may be performed by peripheral circuits on the memory chip. The data is then programmed to the partial-page area of the memory array in plane 0. Because there is no data to be written in plane 1, programming of plane 1 may be inhibited during programming of this data. In another example, instead of redirecting the data in the on-chip cache to a different portion of the memory array, the data is read back to the memory controller and is then written to another portion of the memory array.

Figure 8B:
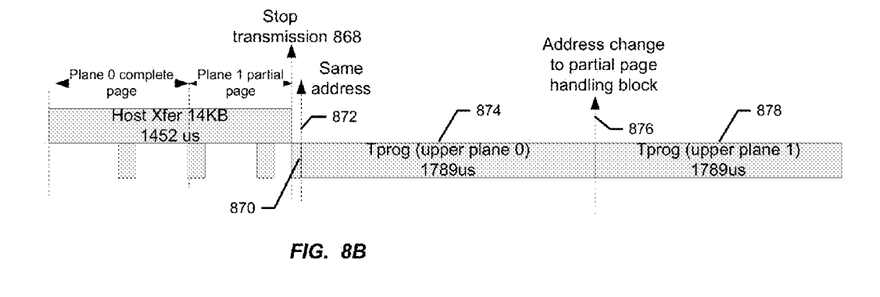
FIG. 8B shows a timing diagram for another example of partial-page programming.

FIG. 8B shows a timing diagram for a scenario where a stop transmission command 868 is received at a point where the cached data extends over more than a single die-page. In this case 14 KB are received (where each die-page holds 16 KB) prior to receipt of the stop transmission command 868. When the stop transmission command is received 868, all data remaining in the controller RAM (2 KB in this example) is transferred to on-chip cache 870, which already contains 12 KB. In this example, there is sufficient data to fill a die-page in plane 0, so no address change is performed 872 and the data in plane 0 is programmed to its default destination 874 (i.e. to the complete-page portion of the memory array). Programming of plane 1 is inhibited during programming of plane 0. Subsequently, an address change is performed 876 and the data in on-chip cache to be programmed to plane 1 is programmed to the partial-page area 878. Thus, these two operations are performed sequentially. While this example (and some other examples presented here) show writing of upper page data, aspects of the present invention may also be applied to writing of lower page data. In some examples, partial page data is written to lower pages, while full page data is written to upper pages in the same physical portion of the memory array. Thus, the division of the memory array between a complete-page area and a partial-page area is not necessarily a physical division where cells store only one or the other. Cells may store partial-page data in one logical page while storing complete-page data in another logical page.

Figure 9A:
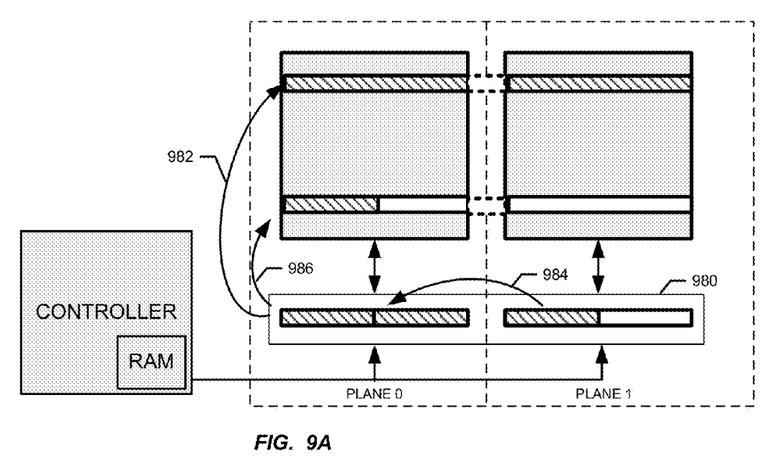
FIG. 9A shows an example where all partial-page data is stored in one plane of a two-plane memory array.

While the above examples show a partial-page area that extends across all planes of the memory array, in some cases the partial page area may be limited to a subset of all planes (as few as one plane). In the example of FIG. 9A, the partial-page area is limited to plane 0, so that the entire partial-plane area of the memory area is contained in plane 0. In this example, any partial-page data that is held in the on-chip cache 980 to be written to plane 1 is instead written to the partial-page area in plane 0. In contrast to the scheme of FIG. 7, in this example data in the on-chip cache is not written to the same plane but is relocated prior to writing. Starting with 12 KB in the on-chip cache (as shown in FIG. 7), the data in the plane 0 portion of the on-chip cache is written to the complete-page portion of plane 0 982. Next, instead of writing data in the plane 1 portion of the on-chip cache 980 to plane 1, this data is moved 984 to the plane 0 portion of the on-chip cache. This data is then written 986 to the partial-page portion of the memory array (which is in plane 0).

Figure 9B:
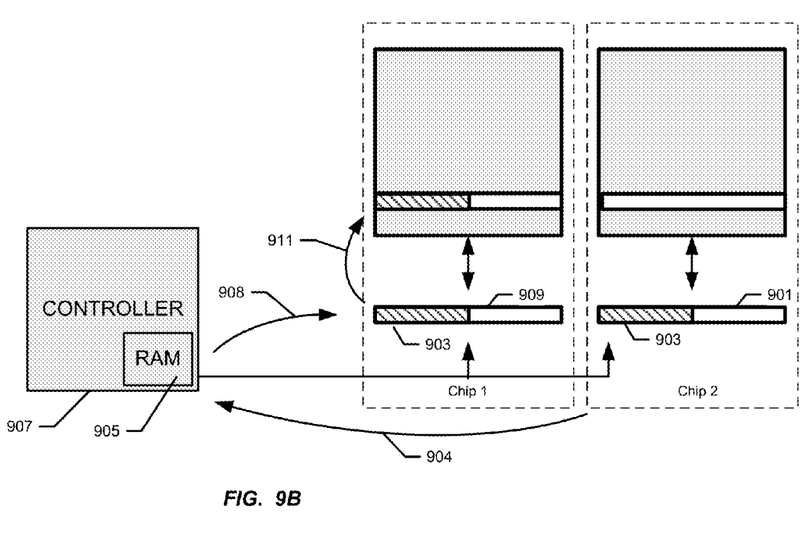
FIG. 9B shows an example where data is relocated through controller RAM.

While the example of FIG. 9A shows data being relocated within on-chip cache without sending data to the controller, in some cases the controller may be used in transferring data. For example, data may be transferred from one chip to another chip where it is written. In this case, the data may be sent to controller RAM, and then sent from controller RAM to the chip where it is to be stored. FIG. 9B shows an example where on-chip cache 901 of chip 2 contains partial-page data 903 when a stop transmission command is received. In this example, it is desirable to write the partial-page data 903 to another chip (chip 1). This may be because chip 2 only stores complete-page data, or because any partial-page storage area on chip 2 is unavailable, or for some other reason. Partial-page data 903 is sent 904 to controller RAM 905 in controller 907. Then, partial-page data 903 is sent 908 from controller RAM 905 to on-chip cache 909 in chip 1. Partial-page data 903 is then written 911 to the memory array in chip 1.

Figure 10:
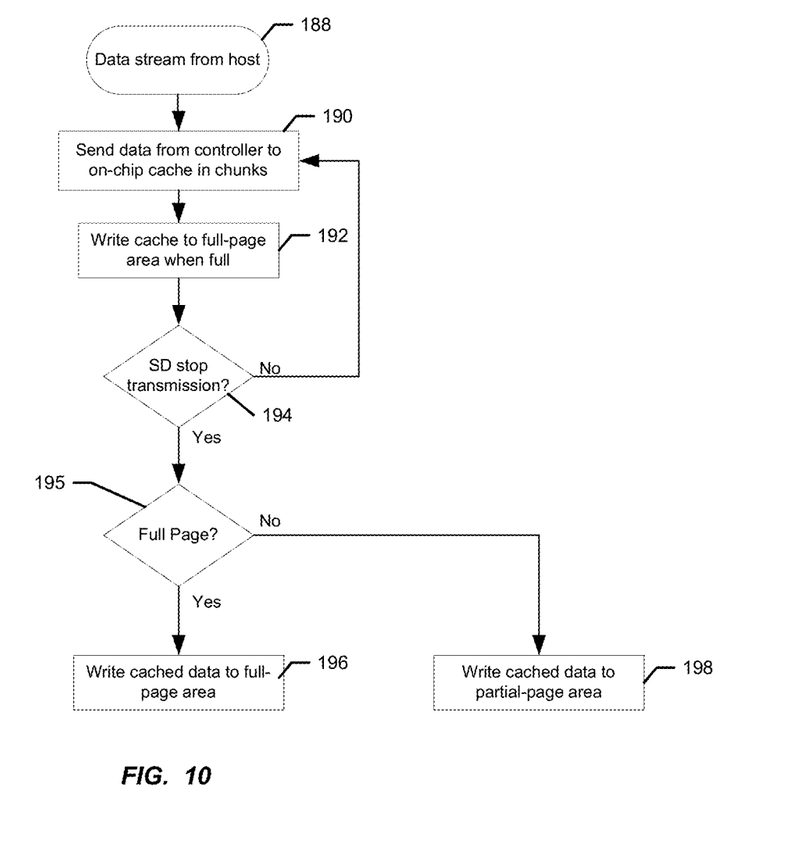
FIG. 10 shows a flowchart of a data storage scheme.

FIG. 10 shows a flowchart for data storage according to some embodiments of the present invention. A stream of data is received 188 from a host and is sent 190 from the memory controller to an on-chip cache in chunks that are smaller than a page. The data in the on-chip cache may be assigned to a default address in the complete-page portion of the memory array. Whenever a sufficient number of chunks are received by the on-chip cache to fill a page, the cached data is written 192 to an address in the complete-page portion of the memory array. If no stop transmission command is received 194, the memory system continues to write data to the memory array as complete pages are received. If a stop transmission command is received at any point 194, then a determination is made as to whether on-chip cache contains data of a full page 195. If the data in on-chip cache is enough for a full page, then the data is written to the full page area 196. If the data in on-chip cache is less than a full page then it is written to the partial-page area of the memory array 198 This means that the default address in the complete-page area is replaced by an address in the partial-page area. In some cases, this means that all cached data is written to the partial-page area, while in other cases, cached data in some planes may be written to the complete-page area.

Although the various aspects of the present invention have been described with respect to certain preferred embodiments, it is understood that the invention is entitled to protection within the full scope of the appended claims. Particular examples show one or two planes in a memory array, though aspects of the invention apply to memory arrays using different numbers of planes.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

What is claimed is:

1. A method comprising:
receiving, by a memory system, data from a host communicatively coupled to the memory system, the memory system including a memory controller and one or more non-volatile memory arrays;
temporarily storing, by the controller, the received data in a volatile memory of the controller;
retrieving, by the controller, the data from the volatile memory;
temporarily storing, by the controller, the data retrieved from the volatile memory in an on-chip memory cache; and
when
a stop-transmission command is received from the host, and
the data stored in the cache includes a partial-page and a complete-page, the complete-page in a first portion of the cache associated with a first plane of the one or more non-volatile memory arrays, the partial-page in a second portion of the cache associated with a second plane of the one or more non-volatile memory arrays, wherein the first plane includes a first logical area and a second logic area, the first logical area of the first plane dedicated to storing complete-pages, the second logical area of the first plane dedicated to storing partial-pages, and the second plane includes a third logical area, the third logical area of the second plane dedicated to storing complete-pages,
then
retrieving, by the controller, the data from the cache;
storing, by the controller, the complete-page retrieved from the first portion of the cache in the first logical area in the first plane;
transferring the partial-page from the second portion of the cache to the first portion of the cache; and
storing, by the controller, the partial-page transferred from the second portion of the cache in the second logical area of the first plane.

2. The method of claim 1 wherein the stop-transmission command is a Secure Digital stop-transmission command from a host.

3. The method of claim 1 wherein the data received from the host is initially assigned by the host to a first logical address in the first logical area, and when the stop-transmission command is received, the data is assigned to a second logical address in the second logical area of the one or more memory arrays.

4. The method of claim 3 wherein the data is assigned to the second logical address by the controller.

5. The method of claim 3 wherein the data is assigned to the second logical address by an on-chip circuit that is outside the one or more memory arrays.

6. The method of claim 1 wherein the one or more memory arrays include multi-level cells that each individually can store more than one bit of data.

7. The method of claim 1 wherein the one or more memory arrays include two or more planes that can be programmed to store data in parallel.

8. The method of claim 7 wherein the second logical area of the one or more memory arrays that is dedicated to storage of partial-page data extends across the two or more of the planes.

9. The method of claim 7 wherein the second logical area of the one or more memory arrays that is dedicated to storage of partial-page data is limited to one plane of the two or more planes.

10. The method of claim 1, wherein the memory capacity of the volatile memory is less than the memory capacity of the on-chip cache.

11. The method of claim 1, wherein the memory capacity of the volatile memory is less than a complete page.

12. A method comprising:
maintaining, by a memory controller, a first logical area of one or more non-volatile memory arrays that is dedicated for storage of one or more complete pages of data, the first logical area associated with a first plane of the one or more non-volatile memory arrays;
maintaining, by the memory controller, a second logical area of the one or more non-volatile memory arrays that is dedicated for storage of one or more partial pages of data, the second logical area associated with the first plane;
maintaining, by the memory controller, a third logical area of the one or more non-volatile memory arrays that is dedicated for storage of one or more complete pages of data, the third logical area associated with a second plane of the one or more non-volatile memory arrays;
receiving, by the memory controller, data from a data stream;
temporarily storing, by the memory controller, the data in a volatile memory of the controller;
when the memory capacity of the volatile memory is reached or a stop-transmission command is received:
retrieving, by the memory controller, the data from the volatile memory;
temporarily storing, by the memory controller, the data retrieved from the volatile memory in a buffer before a determination is made whether to store portions of the data in the first logical area, the second logical area, or the third logical area, the portions of the data stored in the buffer including a complete-page and a partial-page, the complete-page in a first portion of the buffer associated with the first plane, the partial-page in a second portion of the buffer associated with the second plane;
storing, by the memory controller, the complete-page from the first portion of the buffer in the first logical area;
transferring the partial-page from the second portion of the buffer to the first portion of the buffer; and
storing, by the memory controller, the partial-page from the first portion of the buffer in the second logical area.

13. The method of claim 12 wherein the determining is performed in response to receiving a stop-transmission command.

14. The method of claim 13 wherein the stop-transmission command is a Secure Digital stop-transmission command received from a host.

15. The method of claim 12 wherein the one or more non-volatile memory arrays include two or more planes that can be programmed to store data in parallel, and the second logical area extends across all of the two or more planes.

16. The method of claim 12 wherein the one or more non-volatile memory arrays include two or more planes that can be programmed to store data in parallel, and the second logical area is contained within only one of the two or more planes.

17. The method of claim 16 wherein determining whether to store the data in the first logical area or the second logical area comprises determining whether the portion of the data is a complete page or is a partial page that does not fill a complete page.

18. The method of claim 17 wherein determining whether at least one portion of the data is a complete page or is a partial page comprises determining whether a stop-transmission command has been received.

19. The method of claim 12, wherein the memory capacity of the volatile memory is less than the memory capacity of the page buffer.

20. The method of claim 12, wherein the memory capacity of the volatile memory is less than a complete page.

21. A method comprising:
receiving, by a memory controller of a memory system that includes one or more non-volatile memory arrays, data from a data stream from a host without a current or prior indication of the amount of data in the data stream;
temporarily storing, by the memory controller, the data in a volatile memory of the memory controller;
retrieving, by the memory controller, the data from the volatile memory;
storing, by the memory controller, the data to an on-chip memory cache prior to identifying portions of the data as constituting a complete page or a partial page;
while the data is temporarily stored in the on-chip cache, receiving, by the memory controller, an indication from the host that requires the data to be stored in the one or more non-volatile memory arrays;
in response to receipt of the indication, determining, by the memory controller, that a first portion of the data constitutes a full page and a second portion of the data constitutes a partial page, the complete-page in a first portion of the cache associated with a first plane of the one or more non-volatile memory arrays, the partial-page in a second portion of the cache associated with a second plane of the one or more non-volatile memory arrays, wherein the first plane includes a first logical area and a second logic area, the first logical area of the first plane dedicated to storing complete-pages, the second logical area of the first plane dedicated to storing partial-pages, and the second plane includes a third logical area, the third logical area of the second plane dedicated to storing complete-pages;
in response to the determination, selecting, by the memory controller, the first logical area to store the first portion of the data retrieved from the cache
storing the first portion of the data retrieved from the cache in the first logical area;
transferring the partial-page from the second portion of the cache to the first portion of the cache;
selecting the second logical area to store the second portion of the data retrieved from the cache; and
storing the second portion of the data retrieved from the cache in the second logical area.

22. The method of claim 21 wherein the indication is a Secure Digital stop-transmission command.

23. The method of claim 21 wherein the one or more memory arrays include two or more planes that can be programmed to store data in parallel, and the selected area extends across all of the two or more planes.

24. The method of claim 21 wherein the one or more memory arrays include two or more planes that can be programmed to store data in parallel, and the selected area is limited to a subset of the two or more planes that does not include all of the two or more planes.

25. The method of claim 24 wherein the selected area is limited to only one of the two or more planes.

26. The method of claim 21, wherein the memory capacity of the volatile memory is less than the memory capacity of the on-chip cache.

27. The method of claim 21, wherein the memory capacity of the volatile memory is less than a complete page.

28. A memory system comprising:
one or more non-volatile memory arrays that include a first logical area dedicated to storing complete pages of data, a second logical area dedicated to storing partial pages of data, and a third logical area dedicated to storing complete pages of data, the first logical area and the second logical area in a first plane of the one or more non-volatile memory arrays, and the third logical area in a second plane of the one or more non-volatile memory arrays;
an on-chip memory cache having a first portion associated with the first plane and a second portion associated with the second plane; and
a controller having a volatile memory, the controller being configured to:
receive data from a host;
temporarily store the received data in the volatile memory;
retrieve the data temporarily stored in the volatile memory;
store the retrieved data in the on-chip cache prior to determining whether to store the received data in the first logical area or the second logical area, the stored data including a partial-page and a complete-page, the complete-page in the first portion of the cache, and the partial-page in the second portion of the cache;
store the complete-page retrieved from the cache in the first logical area;
transfer the partial-page from the second portion of the cache to the first portion of the cache; and
store the partial-page retrieved from the cache in the second logical area.

29. The memory system of claim 28 wherein the one or more non-volatile memory arrays include two or more planes that can be programmed to store data in parallel.

30. The memory system of claim 29 wherein the second logical area extends across all of the two or more planes.

31. The memory system of claim 29 wherein the second logical area is contained within only one of the two or more planes.

32. The memory system of claim 28 wherein the controller is configured for bi-directional communication with the host.

33. The memory system of claim 32 further comprising a memory card physical interface that enables the bi-directional communication with the host.

34. The memory system of claim 32 wherein the controller is configured to transfer partial pages of data from the on-chip cache to the second logical area.

35. The memory system of claim 28, wherein the memory capacity of the volatile memory is less than the memory capacity of the on-chip cache.

36. The memory system of claim 28, wherein the memory capacity of the volatile memory is less than a complete page.

* * * * *